May 19, 1936.      V. CANTINI      2,041,322
FLOAT FOR FISHING LINES
Filed April 15, 1935
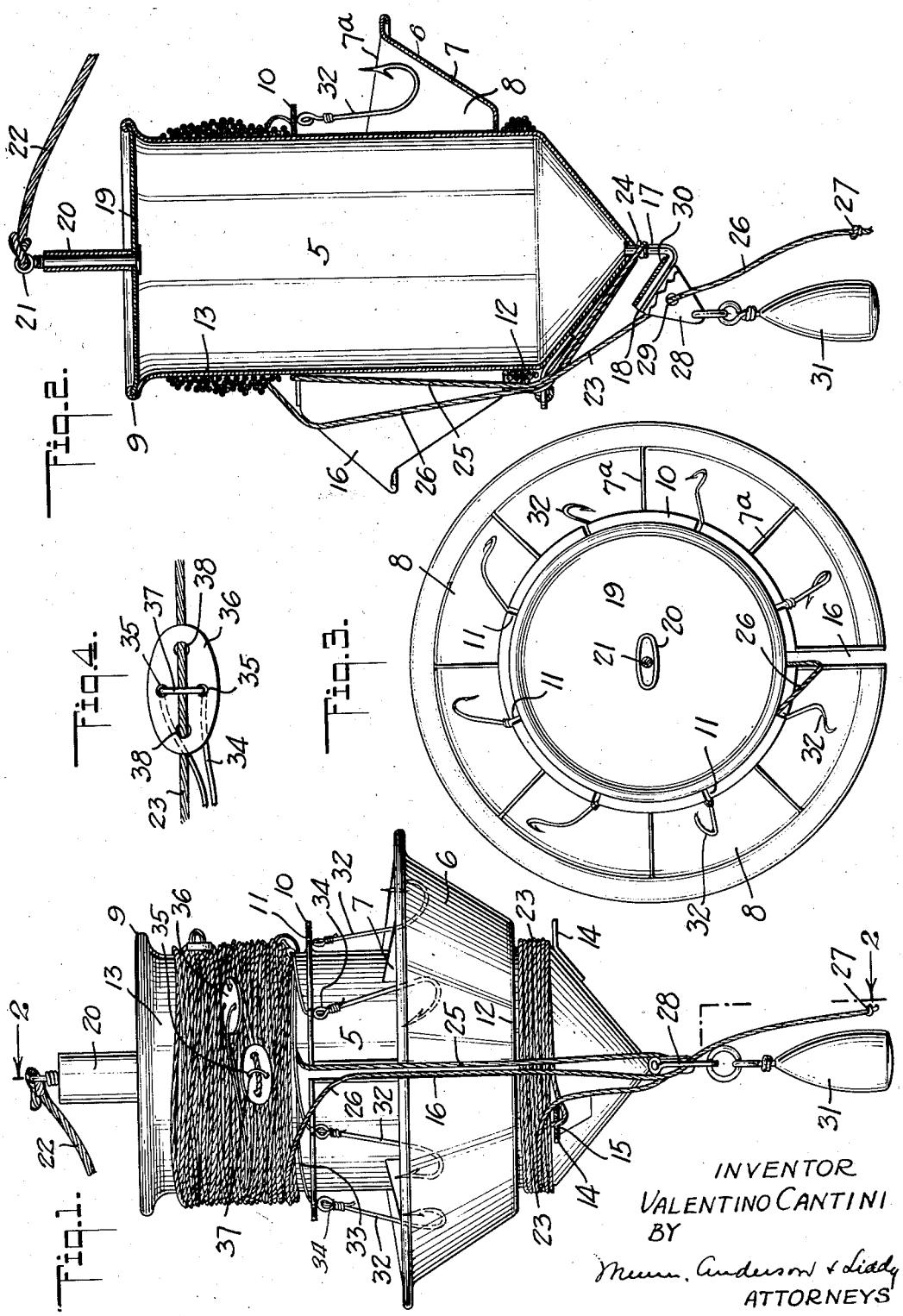
INVENTOR
VALENTINO CANTINI
BY
Munn, Anderson & Liddy
ATTORNEYS Patented May 19, 1936

2,041,322

UNITED STATES PATENT OFFICE 2,041,322

FLOAT FOR FISHING LINES

Valentino Cantini, Santa Barbara, Calif., assignor of one-half to Francesco Bonazzola, Santa Barbara, Calif.

Application April 15, 1935, Serial No. 16,464

6 Claims. (Cl. 43—31)

This invention relates to floats for fishing lines, and has for an object the provision of an exceedingly novel and highly useful device of this character which, in addition to functioning as a float, will house the hook or hooks of the line while throwing the float into the water and automatically release same and enable the hooks to be successfully paid out and descend into the water below the float when the latter contacts the water, whereby to prevent the hooks from accidentally catching in the clothing of the person or causing bodily injury to the person.

Another object of the invention is to provide a device of this character in which provision is made for accommodating a plurality of hooks and for disposing them at predetermined distances from each other.

With the above and other objects in view, which will appear as the nature of the invention is better understood, the same consists in the improved construction of parts which will be fully described and particularly pointed out in the hereto appended claims.

In the accompanying drawing has been illustrated a single and preferred form of the invention, it being, however, understood that no limitations are necessarily made to the precise structural details therein exhibited, but that changes, alterations and modifications within the scope of the claims may be resorted to when desired.

In the drawing:

Figure 1 is a view in side elevation of the float;

Figure 2 is a vertical longitudinal section taken on line 2—2 of Figure 1;

Figure 3 is a top plan view of the float;

Figure 4 is a plan view of a hook attaching and securing element.

In carrying the invention into practice, a hollow cylindrical body 5 is employed, the same being vertically disposed and provided at its base with a substantially conical structure 6, providing a flared skirt or wall 7 which extends entirely around the float in spaced apart relationship to the vertical walls thereof. As illustrated, partitions 7a extend between said wall 7 and the vertical walls of the cylindrical body 5 to provide an annular series of hook compartments 8, as clearly illustrated in Figure 3.

The cylindrical body 5 is flanged at its upper end at 9, and spaced apart therefrom and disposed above the compartments 8 is an annular flange 10, the same having vertical slots 11 formed therein and disposed directly above the receptacles or compartments 8.

The structure 6 is formed with a relatively wide annular groove 12 which, in effect, is a spool that is intended to function in co-action with the spool portion 13 of body 5 between flanges 9 and 10, and, as illustrated, the structure 6 beneath the groove 12 is provided with lateral lugs 14 by means of which the line, when wound in the groove 12, will be retained in a wound condition. One of these lugs is formed with a vertical passage 15 which is disposed to one side of a vertical slot 16 formed in the body 6 and extending from the groove 12 to the flange 10. At the apex of the body 6 is a depending shank 17 which is formed with an angularly disposed pin 18 for a purpose to be explained presently.

The head 19 of the body 5 is provided with a shank 20 which supports a swivel 21 to which one end of a line 22 is attached. The opposite end of this line may be either held in the hand of the operator, when fishing, or it may be connected in the customary manner with a fishing rod.

Wound about the spool portion formed by the groove 12 in the conical structure 6 is a hook line 23, one end of which is passed through the passage 15 in the adjacent lug 14, after which as much of the line as desired is wound around said spool and the opposite end of the line passed around the stem 17, knotted at 24, and then brought up along one side of said structure 6 to provide a vertical stretch 25 which is received in the slot 16. The line is then wound around the spool portion 13 and the terminal end thereof passed into the slot 16 to provide a return stretch 26, and same is knotted at 27 and adapted to contact with a sinker-retaining device 28 through the aperture 29 of which the stretch 26 passes, as shown in Figure 2. The device 28 is formed with a tubular portion 30 which is adapted to pass over the angular extension 18 of stem 17 and to free itself therefrom when the knot 27 is suddenly brought into contact with the device at one side of the aperture 29 when the float strikes the water after being thrown from the hand of the user, at which time, it is to be understood, the stretch 26 will be drawn in an upward direction and by contact of knot 27 with the device 28, the said device will be entirely disengaged from the portion 18, at which time it will descend into the water by reason of the sinker 31. When thus descending, the movement of the device will be stopped by its engagement with the aforementioned knot 27.

The portion of the line which is wrapped around the spool 13 may be of any suitable length. In the present illustration, it is of sufficient length to accommodate eight fish hooks 32, the gut line-attaching device 33 of each hook being adapted to be wound around the spool with the line, as will be clearly appreciated on reference to Figure 1. The said gut portion of each hook is formed at its line-attaching end with a loop 34, the side leads of which are passed through apertures 35 in an oval-shaped plate 36, and the bight portion 37 thereof brought against one side of the plate. The line is threaded through apertures 38 in the plate, and by reason thereof the plate can be adjusted to a predetermined position on the length of the line, depending upon the intended distance which separates the hooks. In the present illustration, the hooks are equidistantly arranged upon that part of the line which is wrapped around the spool 13, and the lengths of the gut line-attaching elements of the hooks are predetermined with respect to the positions of the receptacles 8, so that the said gut attaching devices can be passed downwardly through the slots 11 in flange 10 and the hooks positioned in the receptacles as shown in Figure 3, it being understood that in so placing the hooks they will be baited and the bait may also be temporarily received in said receptacles.

Assuming the parts to be in the position shown in Figure 1, the line 22 can be held in the hand and the float swung until sufficient momentum is gathered to enable the float to be thrown the desired distance into the water. When the float contacts the water, the stretch 26 of the line will be drawn in an upward direction so that the knot 27 will function to release the device 28 from the angular portion of stem 17, at which time the portion of the line which is wrapped around the spool 13 will gradually unwind, whereby to effect successive release of the hooks from the receptacles 8, it being understood that this operation is facilitated by the action of the sinker 31, which tends to pull downwardly upon the line the moment the device 28 is released and contacts the stop knot 27.

From the foregoing description, it will be appreciated that the device functions as a float and also as a means for concealing the hooks after they have been baited and before the float is cast in the water, thus preventing accidental entanglement of the hooks with other lines adjacent thereto. It will be further understood that when swinging the float in casting same into the water, the hooks will be so concealed and confined within the receptacles as to avoid any accidental contact with the person of the user.

Should it be desired that the hooks 32 be separated from each other a greater distance than that shown, and a similar number of hooks employed, the intermediate portion of the line, which is that portion which is wrapped around the spool 12, can have paid thereonto such additional portion of the line as is not intended to be wrapped around the spool 13. It is for this reason that a continuous line is employed, a part of which is wound around the spool 12 and a part around the spool 13.

Where it is referred to herein with respect to the unwinding of the line on release of the weight 31 as when the float strikes the water, it is to be understood that the weight functions to exert a downward tension on the line sufficient to cause effective rotation or spinning of the float sufficient to enable the hooks to operatively vacate their respective receptacles. So far as I know, it is broadly new in the art to provide a float so designed, constructed and arranged as to provide for this rotational movement, and such feature will be broadly claimed herein.

I claim:

1. A float for fishing lines having hook housing means; a line having permanent connection with the float at the bottom thereof and provided with a portion wound around the float above said bottom and having a hook removably received in the housing means, the housing means having an open side from which the hook is directly exposed when the line is wound about the float and means for retaining said portion of the line in a wound condition while throwing the float into the water and including releasing means therefor formed to actuate the retaining means to enable said portion to unwind from the float when the latter contacts the water.

2. A float for fishing lines having hook housing means; a line having permanent connection with the float at the bottom thereof and provided with a portion wound around the float above said bottom and having a hook removably received in the housing means, and means for retaining said portion of the line in a wound condition while throwing the float into the water and including releasing means therefor formed to actuate the retaining means to enable said portion to unwind from the float when the latter contacts the water, and said releasing means including a weighted device through which a free end of the line can slide and said retaining means embodying a member from which the weighted means is removably suspended while the float is being thrown and until it strikes the water, and said free end of the line having a stop element engageable with said weighted device to lift same off of said retaining means when the float contacts the water, as aforementioned.

3. A float for fishing lines comprising a buoyant body having an upwardly opening receptacle and said body having a vertical spool disposed above the receptacle; and a line having a portion wound around the spool and provided with a hook disposed to be contained in the receptacle when the line is wound and to vacate the receptacle during unwinding of the line and said line including a portion secured to the float at the bottom thereof so that the hook will depend from said bottom when the line is unwound and the float is in the water.

4. A float for fishing lines comprising a buoyant body having an annular series of upwardly opening receptacles, and a vertical spool disposed above the plane of the receptacle; a line removably wound around the spool and having hooks spaced apart from each other and removably received in the respective receptacles when the line is wound on the spool and adapted to successively vacate the receptacles as the line unwinds, and said line having an end secured to the bottom of the float so that when the line is unwound as aforementioned, same will hang from said bottom.

5. A float for fishing lines comprising a buoyant body having an annular series of upwardly opening receptacles and a vertical spool disposed above the plane of the receptacle; a line removably wound around the spool and having hooks spaced apart from each other and removably received in the respective receptacles when the line is wound on the spool and adapted to successively vacate the receptacles as the line unwinds, and said line having an end secured to the bottom of the float so that when the line is unwound as aforementioned, same will hang from said bottom, a weight on the line at the bottom of the float; and means on the float at said bottom from which the weight is removably suspended and the line held wound and said means formed so that when the float strikes the water, the weight will be released therefrom to enable the line to unwind from the spool.

6. A float for fishing lines comprising a buoyant body having a swivel at its upper end to which a line can be attached and having means at its lower end to which one end of a hook line can be permanently attached and its opposite end removably attached to said lower end; means disposed between said upper and lower ends of the body around which an intermediate portion of the hook line can be wound, and said body having an annular series of hook and bait receptacles disposed below the plane of said second named means.

VALENTINO CANTINI.